Dec. 25, 1923.  
W. J. KLEYSTEUBER  
MEASURING INSTRUMENT AND DRILL GUIDE  
Filed Nov. 18, 1922  
1,478,477
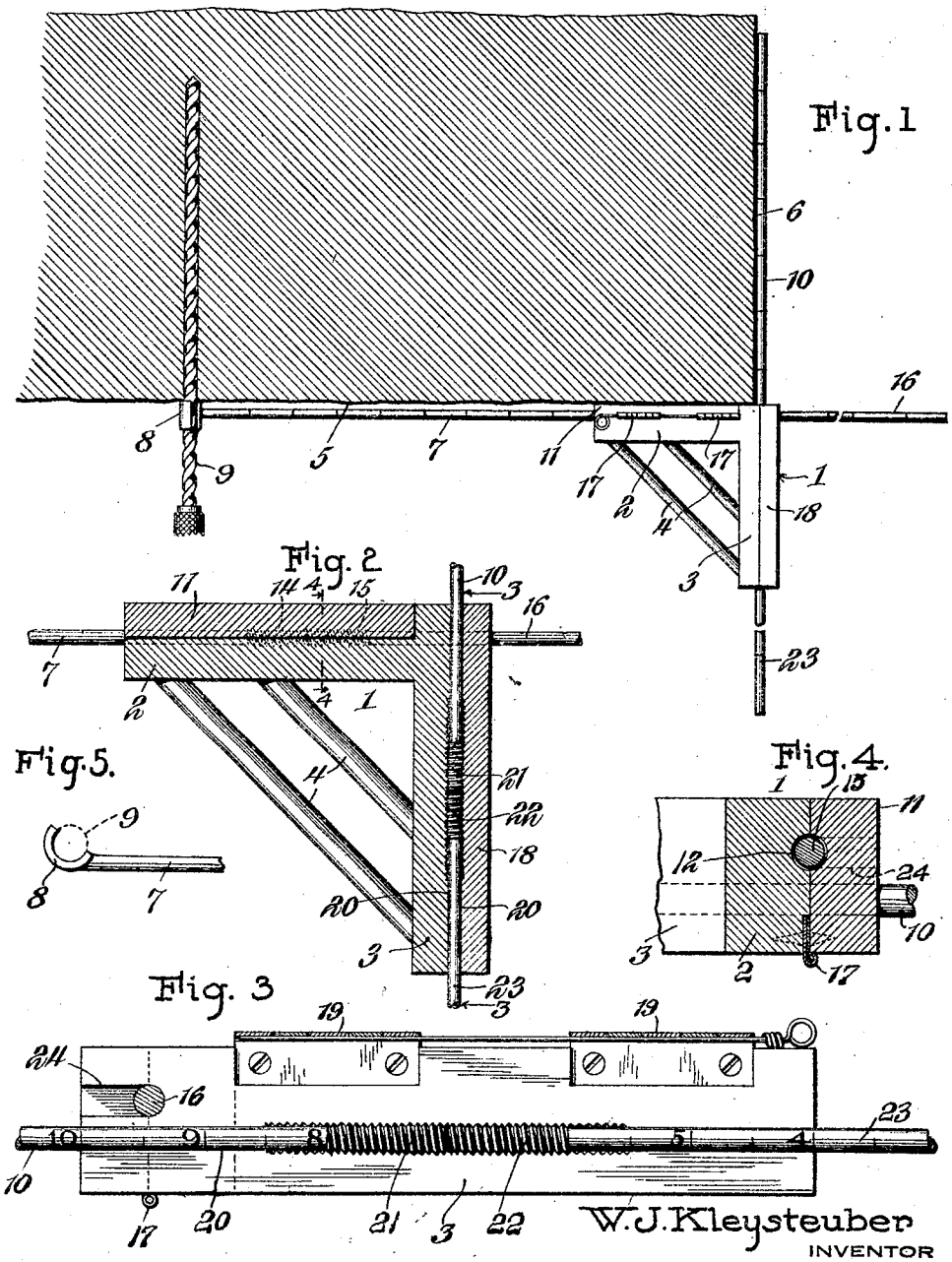
W. J. Kleysteuber  
INVENTOR
WITNESSES  
BY  
ATTORNEY Patented Dec. 25, 1923.

1,478,477

UNITED STATES PATENT OFFICE.

WILLIE J. KLEYSTEUBER, OF CENTRALIA, ILLINOIS.

MEASURING INSTRUMENT AND DRILL GUIDE.

Application filed November 18, 1922. Serial No. 601,938.

*To all whom it may concern:*

Be it known that I, WILLIE J. KLEYSTEU-BER, a citizen of the United States, residing at Centralia, in the county of Marion and State of Illinois, have invented a new and useful Measuring Instrument and Drill Guide, of which the following is a specification.

This invention relates to measuring instruments and drill guides for use in mining coal and other materials.

The object is to provide an instrument which may be readily operated and adjusted by a miner to determine whether or not the hole bored in the face of the body of coal is parallel with the side wall thereof, so that he may know the exact amount of powder or other blasting material to be used in blowing off the corner of coal, and thus prevent the shot from blowing out of the mouth of the hole which sometimes causes fatal explosions in the mine.

Another object is to provide an instrument which will enable the miner to accurately set the mining machine by attaching the device to the auger or boring tool to cause the latter to be guided straight into the wall of coal and parallel to the side wall thereof.

A further object is to provide a combined measuring device and guide for the drill which may be readily attached or detached from the latter, and having rods held rigidly in right-angular relation to each other to lie against the front and side walls of the body of coal respectively, said rods being readily secured in position to an angular body member adapted to be held by the hand at the corner of the coal, the front wall rod having measuring indicia thereon and provided with means for engagement with the drill.

A full and complete understanding of the invention may be obtained from a consideration of the following detailed description taken in connection with the accompanying drawing forming a part of this specification, it being understood that while the drawing shows a practical form of the invention, the latter is not confined to strict conformity with the showing thereof, but may be changed or modified so long as such changes or modifications mark no material departure from the salient features of the invention, as specifically pointed out in the appended claims.

In the drawing, in which similar reference characters designate corresponding parts throughout the several figures:—

Fig. 1 is a horizontal section through a body of coal and showing the device in position to guide the drill of a boring machine and to measure the distance between the bore and the side wall of the coal.

Fig. 2 is an enlarged horizontal sectional view through the body member of the device and showing the manner of connecting the detachable measuring and guiding rods therewith.

Fig. 3 is a further enlarged sectional view taken on the line 3—3 of Fig. 2, and looking in the direction indicated by the arrows.

Fig. 4 is a cross section taken on the line 4—4 of Fig. 2, and drawn on the same scale as Fig. 3.

Fig. 5 is a detail section through the clamp for connecting one of the measuring rods with the drill of the boring bachine.

In the mining of coal, a hole or a series of holes are bored in the face of the wall thereof for the purpose of receiving a quantity of explosive material which, when discharged, blows off a quantity of coal, leaving a more or less irregular end or side wall, after which another hole or series thereof are bored in a vertical line from the end wall, and the operation repeated. If the hole is not bored straight or substantially parallel with the said end or side wall, and the auger or boring tool is directed at an angle towards the side wall, the miner may waste his explosive material by a charge unnecessarily large for the purpose of blowing off the corner of coal. If, however, the boring tool is directed too far in the opposite direction, the charge is insufficient to dislodge the unexpected large quantity of coal between the same and the side wall, when the result is that the discharge takes place out of the mouth of the bore, often resulting in disastrous explosions in the mine.

The present invention is designed to avoid these disadvantages by the provision of a simple, cheaply manufactured and readily operated device, which may be quickly attached to the boring tool of a mining machine, and having elongated measuring means extending along the front face of the coal to the corner thereof at the intersection of the end or side wall, and there being detachably connected to an angular body member, having in one arm means for receiving and holding the measuring means in the form of a graduated rod and for quickly releasing the same, and in the other arm being provided with similar means for holding another rod adapted to lie against the said side wall.

In the drawing, there is shown a body member 1, which may be composed of some suitable metal, and comprising two right-angular arms 2 and 3, respectively, being joined together at their abutting ends and suitably braced and strengthened by spaced angular bars 4, which act as a convenient handhold to support the body member 1 against the front wall 5 of the body of coal, and at the intersection with the side wall 6 thereof which has been formed by a previous blast.

The arm 2 of the body member 1 is adapted to support in horizontal position against the face of the coal, a guiding and measuring rod 7, having at its free end a substantially semi-circular clamp 8 rigidly secured thereto and adapted to be sprung around the drill, auger or boring tool 9 of any mining machine (not shown). The arm 3 of the body member 1 is provided with means for holding a rod 10 at right angles to the said measuring rod 7, and in horizontal alinement with the same, and is adapted to bear against the face of the side wall 6 of the body of coal.

With the device in this position and held by the hand of the operator, the miner may readily see if the tool 9 is started right and guide the latter straight into the body of coal in parallelism with the side wall and perpendicularly to the face of the coal. If the bore is directed towards or approaches the said side wall, the same may be readily detected by the free end of the rod 10 which will be forced to leave the side wall of the coal.

With the rods held in the body member as described, the device may be used to measure and determine the exact conditions in a hole that has already been bored before the charge of explosive material is placed therein for firing and blowing off the corner of the coal.

The arm 2 is provided along its outer face with a hinged clamping block 11 extending throughout its length, and the abutting faces of the arm 2 and clamping block 11 are provided with alined, longitudinally-disposed, semi-circular grooves or recesses 12, having their intermediate portions threaded, for engagement with the threaded end 14 of the measuring rod 7, the terminal of the latter being located substantially at the center of the said arm 2. The remainder of the internally threaded portions of the arm 2 and block 11 are adapted to hold the threaded end 15 of another measuring rod 16, which may be employed for other similar measuring purposes, if desired.

The hinges 17 connecting the clamping block 11 to the arm 2 of the body member are preferably located at the upper abutting edges of the same, and these with the aforesaid threaded portions permit the quick and easy attachment of the rods 7 and 16 to the body member, and the same may be turned, if desired, for fine adjustment.

The arm 3 is similarly provided with a clamping block 18 hinged thereto at the underside of said arm, as at 19, and said arm and block are provided with alined grooves 20, having their intermediate portions threaded for the threaded end 21 of the rod 10, and a similarly threaded end 22 of an extension rod 23, which is adapted to coact with the rod 16.

As shown in Fig. 4 of the drawing, the alined rods 10 and 23 are located above the alined rods 7 and 16 in order that they may cross each other. The end of arm 3 and the end of the clamping block 18, where they project across the end of the block 11, are provided with slots 24 to permit the ready assembly of the rod 16 after the rods 10 and 23 have been assembled.

From the foregoing, it will be seen that a simple and cheaply manufactured measuring and guiding device has been provided for use by miners or others, which may be easily and quickly assembled for use and readily adjusted and used for the purposes specified.

What is claimed is:

1. In an instrument for miners' use, the combination of a pair of rods, one crossing the other, a drill guide connected to the free extremity of one of the rods and adapted to engage the drilling tool of a drilling machine, and means for connecting the two rods so that they assume a substantially right angular relation to each other, one of said rods being adjustable in the direction of its length and transversely of the other rod.

2. An instrument for miners' use, comprising a pair of measuring rods, a drill guide integrally formed on the extremity of one of the rods and adapted to engage the drilling tool of a drilling machine and guide the same, and means for connecting the said rods together in right angular relation to each other.

3. An instrument for miners' use, comprising a body member, measuring rods held by said body member at right angles to each other, each rod being bodily adjustable in the direction of its length, and a clamp on one of the rods adapted to fit the drilling tool of a drilling machine and guide the same.

4. An instrument for miners' use, comprising a pair of rods, a drill guide integrally formed on one of the rods, a body member connecting said rods and holding them in alinement, and another pair of rods leading from the body member and held in alinement thereby at right angles to the first pair of rods, the individual rods of each pair being adjustable in the direction of their lengths.

5. An instrument for miners' use, comprising a body member having angularly disposed arms provided with seats arranged longitudinally thereof, rods adapted to be fitted into the seats, and hinged clamping blocks mounted on the arms to hold the rods in applied position.

6. An instrument for miners' use, comprising a body member having arms arranged at right angles to each other, said arms having longitudinal grooves in their outer faces and out of alinement with each other, measuring rods adapted to be seated in the grooves, and clamping blocks having complementary grooves in their inner faces to fit said rods and hinged to the upper and lower edges of the arms respectively to hold the arms in right angular relation to each other.

7. An instrument for miners' use, comprising a body member composed of right-angularly disposed arms joined together at one end of each, inclined bars connecting the arms and constituting a handle, said arms having longitudinally-disposed grooves in their outer faces, one groove being located above the other, clamping blocks hinged to the outer faces of the arms and having coacting grooves in their inner faces to register with the first-named grooves, one pair of said hinges being arranged at the top side of one arm and block, and the other hinges being at the lower side of the other arm and block, and measuring rods adapted to be held in said coacting grooves and to extend outwardly at right angles from the body member, one of said rods having a semi-tubular clamp adapted to fit the tool of a drilling machine and guide the same.

In testimony that I claim the foregoing as my own, I have hereto affixed my signature.

WILLIE J. KLEYSTEUBER.